United States Patent Office 3,585,135
Patented June 15, 1971

3,585,135
FIRE INHIBITING COMPOSITION COMPRISING A CHEMICAL FIRE RETARDANT, A MAGNESIUM OXIDE, A CLAY AND AN ADHESIVE
Leonard L. Smith, 22996 Ave. 232; Robert O. Houston, 835 N. Homassel; David Sidney Longacre, 388 Bellah; and Richard Thompson, 246 E Honolulu, all of Lindsay, Calif. 93247; and Donald B. Kempfer, 1047 E. Vandalia, Porterville, Calif. 93257
No Drawing. Continuation-in-part of application Ser. No. 671,992, Oct. 2, 1967. This application Jan. 20, 1970, Ser. No. 4,425
Int. Cl. C09k 3/28
U.S. Cl. 252—8.1
20 Claims

ABSTRACT OF THE DISCLOSURE

A fire inhibiting composition for use in aqueous solution protectively to coat a wide variety of combustible materials, being particularly adaptable for use in suppressing and preventing forest fires and the like, and containing a chemical fire retardant selected from the group consisting of diammonium phosphate, ammonium phosphate, and ammonium sulfate; a magnesium oxide; a clay; and an adhesive material including dry milk solids and a carbohydrate gum.

CROSS-REFERENCE TO RELATED APPLICATION

This application is a continuation-in-part of application Ser. No. 671,992, entitled "Fire Retardant Composition," filed Oct. 2, 1967 which is being abandoned in favor of the present application.

BACKGROUND OF THE INVENTION

Chemical fire retardant materials such as diammonium phosphate, sodium calcium borate, ammonium sulfate, ammonium phosphate, calcium chloride, and the like have been employed by mixing with water for direct application from aircraft and tank trucks on burning forest fuels to extinguish the flaming or glowing phases of combustion. These chemical retardants have also been utilized by application to the forest ahead of the flame front so that combustion is impeded when the fire reaches the treated fuel. This permits the pilots and ground crews to work outside the flame and smoke areas so as substantially to reduce the hazards connected with such work. Since most forest fires are the result of human carelessness, it is desirable to treat such fuels closely adjacent to frequently traveled paths and roadways. Heretofore, this has not been practical primarily because of the short duration of effectiveness of the chemical retardants.

The known fire-fighting preparations generally fall into two classes; first, true retardants such as are designated above which use water merely as a carrier, and second, various thickening agents such as algin and the like which depend exclusively on their water-holding ability for effectiveness. The true retardants have not been commercially acceptable because of their relatively short effective life and because their plant nutritional properties in the relatively large percentages required provide overfertilization and excessive plant growth, thus ultimately creating even greater fire hazards. The thickening agents, while providing a longer effective life, are frequently toxic and thereby injurious to certain plant and animal life. Most frequently, such retardants are washed from the plant surfaces by rain or other precipitation and permitted to accumulate in streams and lakes, thus contaminating the water and frequently killing the fish therein. Furthermore, such thickening agents are frequently abrasive and thus accelerate wear of mixing and applying equipment. They are also subject to spoilage and frequently are highly corrosive to the storage and applying equipment.

The most effective of the true chemical retardants that are economically feasible to employ are generally recognized to be diammonium phosphate, ammonium phosphate, and ammonium sulfate. Although such retardants have been used sucessfully in certain areas, they have not proved effective in plain water solutions, particularly in heavy fuel conditions. The primary reason for this is probably the inability to hold sufficient quantities of the retardant on the larger fuel surfaces. Such chemical retardants are also highly corrosive to copper, brass and bronze, thereby limiting their use in many existing storage and applying devices. These chemicals also do not possess sufficient holding ability in that after their water carrier has evaporated, the chemicals crystalize and are blown or fall from the fuel surfaces. Furthermore, they are easily washed from the plant surfaces by light rains or even dew and are completely incapable of effectively protecting the plants for even relatively short periods. Accordingly, the plants are particularly vulnerable during rainstorms to fires started by accompanying lightning.

SUMMARY OF THE INVENTION

Accordingly, it is an object of the present invention to provide an improved fire inhibiting composition having particular utility as a fire preventative.

Another object is to provide such an improved fire inhibiting composition which is able successfully to utilize diammonium phosphate, ammonium phosphate, ammonium sulfate and the like by holding such chemicals after application in a substantially amorphous, as distinguished from a flaking, condition.

Another object is to provide an improved fire inhibiting composition of the character described having greater adherent properties effectively to hold chemical retardants on combustible fuel materials and to enclose the materials in a protective coating.

Another object is to provide a fire inhibiting composition which is effective for substantially longer periods than commercially available retardant compositions.

Another object is to provide a fire inhibiting composition which is not adversely affected by additional moisture from rain or dew but which utilizes such additional moisture as a carrier to flow the compound into minute crevices and the like in the fuel material.

Another object is to provide a fire inhibiting composition which is non-toxic and does not render the ground excessively nutritious to plant life.

Another object is to provide a fire inhibiting composition which utilizes a non-oxidizing magnesium binder to increase the cohesiveness and insulating ability of the composition and which substantially reduces pyrolysis in both light and heavy fuels.

Another object is to provide a fire inhibiting composition which is substantially non-corrosive to permit the composition to be used in substantially all existing storage and applyng equipment.

Another object is to provide a fire inhibiting composition which is water soluble, economically produced, reasonably inert, and substantially neutral.

Other objects and advantages of the present invention will subsequently become more clearly apparent upon reference to the following description.

DESCRIPTION OF THE PREFERRED EMBODIMENT

As described above, the fire inhibiting composition of the present invention is able to utilize the most effective of the true retardant chemicals including diammonium phosphate, $(NH_4)_2HPO_4$; ammonium phosphate, $$(NH_4)H_2PO_4$$

and ammonium sulfate, $(NH_4)_2SO_4$. It is noted that such true chemical retardants are utilized in the present composition only to the extent necessary adequately to protect the fuel on which the composition is applied. Ammonia gas is released by the first two of these compounds when they become heated which displaces oxygen and prevents or minimizes oxidation of the fuel material even when heated above their usual temperatures of combustion.

The composition of the present invention further includes a montmorillonite clay such as sodium bentonite as a binding agent. A suitable sodium bentonite includes that of the formula $Na_2OAl_2O_34SiO_2NH_2O$. Another bentonite which is suitable is sodium beidellite and has the formula $Na_2OAl_2O_33SiO_2NH_2O$.

An additional adhesive material is employed to enhance the holding ability of the composition on the combustible fuels. The adhesive material includes dry milk solids and a carbohydrate gum. The dry milk solids are excellently suited for the purpose of improving the structure of the bentonite in the water for greater absorption. Such dry milk solids are normally composed of the following:

| | Percent |
|---|---|
| Protein | 36.5 |
| Lactose | 51.5 |
| Fat | 1.0 |
| Mineral | 8.0 |
| Moisture | 3.0 |

The carbohydrate gum utilized in the present composition is selected from the group consisting of gum acacia, gum tragacanth, gum arabic, cholla gum, mesquite gum, cherry gum, flaxseed mucilage, gum karoya, carob-seed gum, and seaweed extract such as agar-agar. These gums are largely composed of potassium, calcium and magnesium salts of hydrophilic carbohydrate acidic bodies. It has been found that gum acacia or gum tragacanth or a combination of both is ideally suited to the formulation of the present invention. They constitute hydrophilic colloids which provide stabilizing and adhesive properties and maintain the various described ingredients in a semi-gel condition after residue formation on fuel surfaces.

Magnesium oxide is employed as a thickening agent to hold the previously described chemical fire retardant in an amorphous condition for extended periods. Furthermore, the magnesium oxide is used in sufficient bulk to inhibit the corrosive effects of the chemical fire retardant to copper, brass, bronze and the like. Inasmuch as the chemical fir retardant is so effectively held in the composition of the present invention, only a minimum amount is necessary which substantially reduces the nutritional value of the composition so as to minimize incidental plant stimulation.

The magnesium oxide employed in the compound of the present invention is preferably of a type known as "Overton Clay" which is currently known only to be mined in Overton, Nev. Overton Clay, however, is a misnomer since the material does not actually belong to the clay family. For example, if fired, it will disintegrate into minute particles and will not harden into a pre-formed shape as will occur upon firing a true clay material, such as bentonite. Additionally, other magnesium oxides such as magnesite may be alternatively employed, if desired. In addition to the reasons previously described, magnesium oxide is used in the present invention since it is already oxidized and thereby provides an excellent fire-resistant shield to insulate each fiber of the fuel material to preclude rapid oxidation and to raise the temperature at which combustion of the fibers will occur. The Overton Clay also functions as an excellent whitener to resist dehydration and behaves, to a minor extent, as an electrolyte having some gelling or water-absorbing qualities to insure a more homogenous mixture. Overton Clay has the following analysis following ignition:

| | Percent |
|---|---|
| Free moisture (max.) | 1.00 |
| MgO | 35.28 |
| $SiO_2$ | 11.76 |
| $Al_2O_3$ | 4.00 |
| CaO | 6.16 |
| $Fe_2O_3$ | .52 |
| Ignition loss (950° C.) | 43.10 |
| pH (10% solids) | 9.02 |

While the present invention is not limited to any precise ratio of ingredients, the following examples serve to typify compositions excellently suited to the purposes set forth:

Example I

A suitable range of the individual constituents of the composition of the present invention for use on light fuel material such as grass and brush utilizing diammonium phosphate is as follows:

To 1600 parts by weight of water is added a pre-prepared blend of:

| | Parts |
|---|---|
| Diammonium phosphate | 50–300 |
| Magnesium oxide | 200–600 |
| Bentonite | 50–200 |
| Dry milk solids | 5–25 |
| Gum tragacanth | 1–40 |

Example II

Another composition of the present invention for use on light fuel material utilizing ammonium sulfate is as follows:

To 1600 parts by weight of water is added a pre-prepared blend of:

| | Parts |
|---|---|
| Ammonium sulfate | 50–250 |
| Bentonite | 10–50 |
| Magnesium oxide | 10–50 |
| Dry milk solids | 1–20 |
| Gum acacia | 0.1–10 |

Example III

A suitable range of the individual constituents of the composition of the present invention for use on heavy fuel material such as forest trees and the like utilizing diammonium phosphate is as follows:

To 1600 parts by weight of water is added a pre-prepared blend of:

| | Parts |
|---|---|
| Diammonium phosphate | 100–400 |
| Magnesium oxide | 300–600 |
| Bentonite | 50–200 |
| Dry milk solids | 5–30 |
| Gum tragacanth | 20–50 |

Example IV

Another composition of the present invention for use on heavy fuel material utilizing ammonium sulfate is as follows:

To 1600 parts by weight of water is added a pre-prepared blend of:

| | Parts |
|---|---|
| Ammonium sulfate | 100–400 |
| Bentonite | 15–100 |
| Magnesium oxide | 15–100 |
| Dry milk solids | 2–30 |
| Gum acacia | 0.2–20 |

Example V

A further suitable range of the individual constituents of the composition of the present invention for general use on a wide variety of fuel materials is as follows:

To 1600 parts by weight of water is added a pre-prepared blend of:

| | Parts |
|---|---|
| Chemical fire retardant (diammonium phosphate, ammonium phosphate, or ammonium sulfate) | 50–400 |
| Magnesium oxide | 200–600 |
| Bentonite | 50–200 |
| Adhesive material including dry milk solids and carbohydrate gum | 1–50 |

The magnesium oxide, diammonium phosphate or ammonium sulfate, bentonite, and adhesive materials are dry-mixed for packaging in any of the above desired ratios depending upon the type of fuel on which the composition is to be employed. For application, one part of the dry mixed composition is added to approximately eight parts of water in selected mixing tanks or other applying equipment for discharge in the usual manner from aircraft or ground tankers.

The aqueous solution containing the fire inhibiting composition of the present invention is thereby strongly adherent to foliage and other combustible fuels and effectively resists washing off by rain or dew. Such additional moisture tends only to enhance the coatability of the composition by serving as a carrier to flow the composition into minute crevices and the like in the fuel material. The composition provides a longer period of effectiveness as compared to other commercially available retardants which are only useful for a few hours as opposed to a period of effectiveness of the composition of the present invention which extends for months. The composition is non-toxic and does not make the ground excessively nutritious for plants because of the lower ammonium and sulfate percentages which are needed to be employed in the composition without adversely affecting its fire retarding ability and because of its vastly improved tenacity for adherence to the positions of application in spite of rain, wind, dew and other environmental factors tending to displace it. The cohesiveness of the composition is substantially increased by the use of Overton Clay which provides an improved insulating material having greater stability and substantially reduces the pyrolysis on either light or heavy fuel materials. Such Overton Clay or its equivalent is not known to the applicant to have been employed in any other known fire retardant composition. Accordingly, fuel material protected by the present composition is maintained in a cooler condition to minimize oxidation and the effective temperature of combustion of the fuel material is substantially raised. As described, the ammonia released by the ammonium compounds effectively replaces oxygen and inhibits combustion. The compositions of the present invention are homogenous and can be mixed with paint or other coating materials effectively to fire-proof substantially any combustible material and for longer periods than heretofore possible.

While the instant invention is described in terms of particular ingredients, and ranges thereof, to be used, it is obvious that many modifications and variations in the nature and proportions of the ingredients may be made without departing from the spirit and scope of the invention; and only such limitations should be imposed as are indicated in the appended claims.

Having described our invention, what we claim as new and desire to secure by Letters Patent is:

1. A fire inhibiting composition comprising a dry mixture of a chemical fire retardant selected from the class consisting of diammonium phosphate, ammonium phosphate and ammonium sulfate, said chemical fire retardant being present in at least about from 50 parts to 400 parts by weight of the composition; a magnesium oxide present in at least about from 200 parts to 600 parts by weight; a montmorillonite clay in from 50 parts to 200 parts by weight; and an adhesive material containing dry milk solids and a carbohydrate gum in from 1 part to 50 parts by weight with said gum being selected from the group consisting of gum acacia, gum tragacanth, gum arabic, cholla gum, mesquite gum, cherry gum, flaxseed mucilage, gum karoya, carob-seed gum, and seaweed extract such as agar-agar.

2. The composition of claim 1 in which said clay is sodium bentonite having the formula

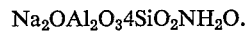

$$Na_2OAl_2O_34SiO_2NH_2O.$$

3. The fire inhibiting composition of claim 1 in which said dry mixture is adapted to be added to water for applying the composition to combustible materials by spraying or the like in a ratio of approximately 1 part of the dry mixture to 8 parts of water.

4. The fire retardant composition of claim 1 in which said magnesium oxide is Overton Clay having approximately the following analysis after ignition: Free moisture 1%; MgO 35.28%; $SiO_2$ 11.76%; $Al_2O_3$ 4%; CaO 6.16%; $Fe_2O_3$ .52%; ignition loss (950° C.) 43.10%; and pH (10% solids) 9.2%.

5. A fire inhibiting composition for use on light fuel such as grass, brush and the like comprising a pre-prepared dry mixture of from 50 parts to 300 parts by weight of diammonium phosphate, 200 parts to 600 parts by weight of magnesium oxide, 50 parts to 200 parts by weight of bentonite, 5 parts to 25 parts by weight of dry milk solids, and 1 part to 40 parts by weight of gum tragacanth.

6. The fire inhibiting composition of claim 5 in which said dry mixture is adapted to be added to water for applying the composition to said fuel materials by spraying or the like in a ratio of approximately 1 part of the dry mixture to 8 parts of water.

7. The fire retardant composition of claim 5 in which said magnesium oxide is Overton Clay having approximately the following analysis after ignition: Free moisture 1%; MgO 35.28%; $SiO_2$ 11.76%; $Al_2O_3$ 4%; CaO 6.16%; $Fe_2O_3$ .52%; ignition loss (950° C.) 43.10% and pH (10% solids) 9.2%.

8. A fire inhibiting composition for use on relatively heavy fuels such as forest timber and the like comprising a pre-prepared dry mixture of from 100 parts to 400 parts by weight of diammonium phosphate, 300 parts to 600 parts by weight of magnesium oxide, 50 parts to 200 parts by weight of bentonite, 5 parts to 30 parts by weight of dry milk solids, and 20 parts to 50 parts by weight of gum tragacanth.

9. The fire inhibiting composition of claim 8 in which said dry mixture is adapted to be added to water for applying the composition to said fuel materials by spraying or the like in a ratio of approximately 1 part of the dry mixture to 8 parts of water.

10. The fire retardant composition of claim 8 in which said magnesium oxide is Overton Clay having approximately the following analysis after ignition: Free moisture 1%; MgO 35.28%; $SiO_2$ 11.76%; $Al_2O_3$ 4%; CaO 6.16%; $Fe_2O_3$ .52%; ignition loss (950° C.) 43.10% and pH (10% solids) 9.2%.

11. A fire retardant composition for use on light fuels such as grass, brush and the like comprising 1600 parts by weight of water to which is added a pre-prepared blend of from 50 parts to 300 parts by weight of diammonium phosphate, 200 parts to 600 parts by weight of magnesium oxide, 50 parts to 200 parts by weight of bentonite, 5 parts to 25 parts by weight of dry milk solids, and 1 part to 40 parts by weight of a carbohydrate gum.

12. The fire retardant composition of claim 11 in which said magnesium oxide is Overton Clay having approximately the following analysis after ignition: Free moisture 1%; MgO 35.28%; SiO$_2$ 11.76%; Al$_2$O$_3$ 4%; CaO 6.16%; Fe$_2$O$_3$ .52%; ignition loss (950° C.) 43.10%; and pH (10% solids) 9.2%.

13. A fire retardant composition for use on relatively heavy fuels such as forest timber and the like comprising 1600 parts by weight of water to which is added a pre-prepared blend of from 100 parts to 400 parts by weight of diammonium phosphate, 300 parts to 600 parts by weight of magnesium oxide, 50 parts to 200 parts by weight of bentonite, 5 parts to 30 parts by weight of dry milk solids, and 20 parts to 50 parts of a carbohydrate gum.

14. The fire retardant composition of claim 13 in which said magnesium oxide is Overton Clay having approximately the following analysis after ignition: Free moisture 1%; MgO 35.28%; SiO$_2$ 11.76%; Al$_2$O$_3$ 4%; CaO 6.16%; Fe$_2$O$_3$ .52% ignition loss (950° C.) 43.10% and pH (10% solids) 9.2%.

15. A fire inhibiting composition for use on light fuels such as grass, brush and the like comprising a pre-prepared dry mixture of from 50 parts to 250 parts by weight of ammonium sulfate, 10 parts to 50 parts by weight of bentonite, 10 parts to 50 parts by weight of magnesium oxide, 1 part to 20 parts by weight of dry milk solids, and 0.1 part to 10 parts by weight of gum acacia.

16. The fire inhibiting composition of claim 15 in which said dry mixture is adapted to be added to water for applying the composition to said fuel materials by spraying or the like in a ratio of approximately 1 part of the dry mixture to 8 parts of water.

17. A fire inhibiting composition for use on relatively heavy fuels such as forest timber and the like comprising a pre-prepared dry mixture of from 100 parts to 400 parts by weight of ammonium sulfate, 15 parts to 100 parts by weight of bentonite, 15 parts to 100 parts by weight of magnesium oxide, 2 parts to 30 parts by weight of dry milk solids, and 0.2 part to 20 parts by weight of gum acacia.

18. The fire inhibiting composition of claim 17 in which said dry mixture is adapted to be added to water for applying the composition to said fuel materials by spraying or the like in a ratio of approximately 1 part of the dry mixture to 8 parts of water.

19. A fire inhibiting composition for use on light fuels such as grass, brush and the like comprising 1600 parts by weight of water to which is added a pre-prepared blend of from 50 parts to 250 parts by weight of ammonium sulfate, 10 parts to 50 parts by weight of bentonite, 10 parts to 50 parts by weight of magnesium oxide, 1 part to 20 parts by weight of dry milk solids, and 0.1 part to 10 parts by weight of gum acacia.

20. A fire inhibiting composition for use on relatively heavy fuels such as forest timber and the like comprising 1600 parts by weight of water to which is added a pre-prepared blend of from 100 parts to 400 parts by weight of ammonium sulfate, 15 parts to 100 parts by weight of magnesium oxide, 15 parts to 100 parts by weight of bentonite, 2 parts to 30 parts by weight of dry milk solids, and 0.2 part to 20 parts by weight of gum acacia.

References Cited
UNITED STATES PATENTS

| | | | |
|---|---|---|---|
| 3,334,045 | 8/1967 | Nelson | 252—2 |
| 3,345,289 | 10/1967 | Freifield | 252—8.1 |
| 3,383,307 | 5/1968 | Goetz | 252—316 |
| 3,409,550 | 11/1968 | Gould | 252—8.1 |

JOHN T. GOOLKASIAN, Primary Examiner

D. J. FRITSCH, Assistant Examiner

106—15; 117—137; 252—2, 7